United States Patent [19]

Eberhardt

[11] Patent Number: 4,503,812
[45] Date of Patent: Mar. 12, 1985

[54] STARTING SYSTEM FOR A PORTABLE ENGINE-PUMP UNIT

[75] Inventor: H. Alfred Eberhardt, Paoli, Pa.

[73] Assignee: Hale Fire Pump Company, Conshohocken, Pa.

[21] Appl. No.: 358,546

[22] Filed: Mar. 15, 1982

[51] Int. Cl.³ .................... F02B 63/06; F02M 31/12
[52] U.S. Cl. .................... 123/2; 123/142.5 E; 123/179 A; 123/527; 123/557; 320/2
[58] Field of Search ............ 123/2, 142.5 R, 142.5 E, 123/527, 179 A, 549, 557; 320/2; 307/10 R

[56] References Cited

U.S. PATENT DOCUMENTS

| | | | |
|---|---|---|---|
| 2,856,543 | 10/1958 | Dixon | 123/142.5 R |
| 3,273,038 | 9/1966 | Miller | 320/2 |
| 3,596,018 | 7/1971 | Elmes | 320/2 |
| 3,694,729 | 9/1972 | Jones | 320/2 |
| 4,211,080 | 7/1980 | White | 180/271 |
| 4,321,522 | 3/1982 | Matsunaga | 320/2 |
| 4,347,472 | 8/1982 | Lemelson | 320/2 |

Primary Examiner—Ira S. Lazarus
Attorney, Agent, or Firm—Frank A. Follmer

[57] ABSTRACT

A portable engine-pump unit is provided with a charging system for maintaining a rechargeable starter battery in a fully charged condition while it is held in a stored position. The starter battery is used to energize heaters for raising the temperature of the engine fuel supply when the unit is removed from the stored position.

13 Claims, 7 Drawing Figures

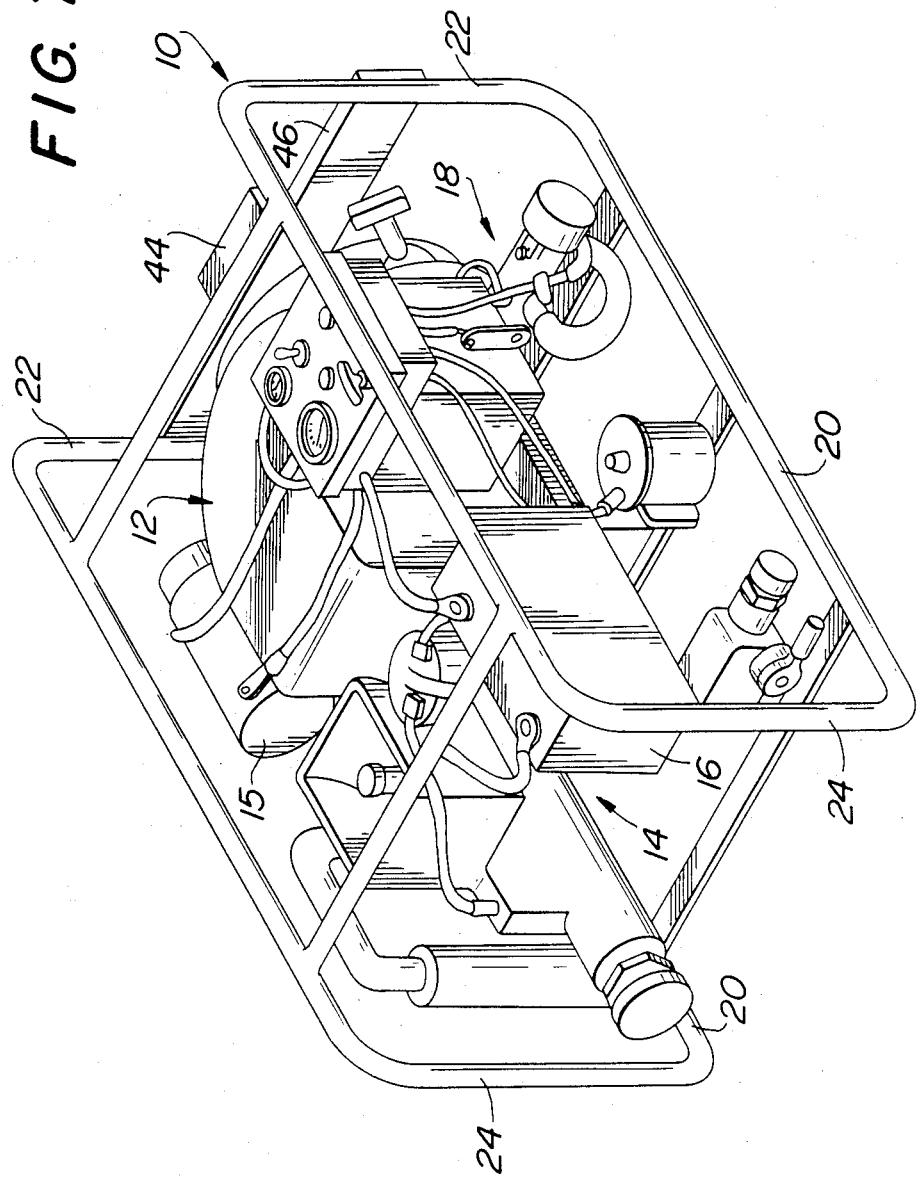

STARTING SYSTEM FOR A PORTABLE ENGINE-PUMP UNIT

BACKGROUND AND SUMMARY OF THE INVENTION

In many applications, such as on board ships, there is a need for a light-weight, reliable portable engine-pump unit. For example, such units are used as portable fire fighting pumps or dewatering pumps. Present-day portable units of the indicated type generally use a two-stroke gasoline engine because of its light weight. However, the use of a fuel such as gasoline involves inherent dangers because of the inflamability of the gasoline.

A rotary piston engine (Wankel engine) is ideal for units of the indicated type because of its light weight, its compactness, and its high speed characteristics. Also, this engine would be safer because its combustion characteristics permit it to be run on diesel-type low volatility fuels easier than a two-stroke gasoline engine. However, their use has not become a reality because of the difficulty in starting an engine with a diesel-type fuel. In applications such as fire fighting it is extremely important that the unit be quickly available in case of an emergency and that the unit can be started with certainty.

It is the general object of the invention to provide a reliable starting means for a portable engine-pump unit. In accordance with the invention there is provided a portable engine pump unit in which a rechargeable electric storage battery may be used for the starting means and means are provided for maintaining this battery fully charged while it is being held in a stored condition.

Briefly stated, the portable engine-pump unit of the invention is provided with a portable frame means on which the pump, the engine and the starting means, including the battery, are mounted. There is provided a stationary holder for releasably receiving the frame means in a stored position, the frame means being movable into and out of the stored position as desired. There is also provided an electric circuit means for supplying a charging current to the battery and power supply means for supplying electrical power to the charging current circuit means. There are provided a pair of cooperable contact means on the power supply means and the charging circuit means adapted to be moved into electrical contact when the portable frame means is mounted in the stored position so as to supply the charging current. The contact means are constructed and arranged to be moved out of electrical contact when the portable frame means is removed from the stored position to disconnect the charging current from the battery.

In accordance with another aspect of the invention there is provided means for raising the temperature of the diesel-type fuel supplied to the engine so as to improve the combustion efficiency of the rotary piston engine. In a typical reciprocating piston diesel engine air is drawn into the cylinder and is compressed to a very high ratio of about 14:1 to 25:1. This high compression causes the air in the cylinder to be heated to a temperature of 700°-900° C. This high temperature causes spontaneous ignition of the diesel fuel that is injected into the cylinder. On the other hand, a rotary piston engine only has a combustion ratio of about 7:1 thereby providing a temperature rise in the combustion chamber of only about half that of the typical diesel engine. Accordingly, there are problems in both starting and running a rotary piston engine with a diesel-type fuel. In accordance with the invention there is provided various means for obviating this problem by raising the temperature of the diesel-type fuel so as to increase the combustibility thereof and thereby improve the running and starting performance of a rotary piston engine using diesel-type fuel.

One form of fuel heating means in accordance with the invention comprises an electric resistance heater for the fuel contained in the carburetor fuel bowl. This heater is energized from the engine starter battery and there is preferably provided a thermoswitch means to control the heating action so as to maintain a desired temperature of the fuel in the fuel bowl. Also, there is provided a switch means for energizing the fuel bowl heater only when the portable frame means is removed from the stored position and preventing any heating action while the portable frame means is maintained in the stored position.

In accordance with another feature of the invention there is provided an electric heater immersed in the engine fuel tank for heating the fuel therein and an electric heater located to supply heat to the expansion valve for a pressurized fuel supply of propane used for starting the rotary piston engine. There is provided circuit means for energizing those electric heaters from the starting battery.

BRIEF DESCRIPTION OF THE DRAWINGS

FIG. 7 is a perspective view of the portable engine-pump unit in accordance with the invention.

DETAILED DESCRIPTION OF THE PREFERRED EMBODIMENTS

Figure 1:
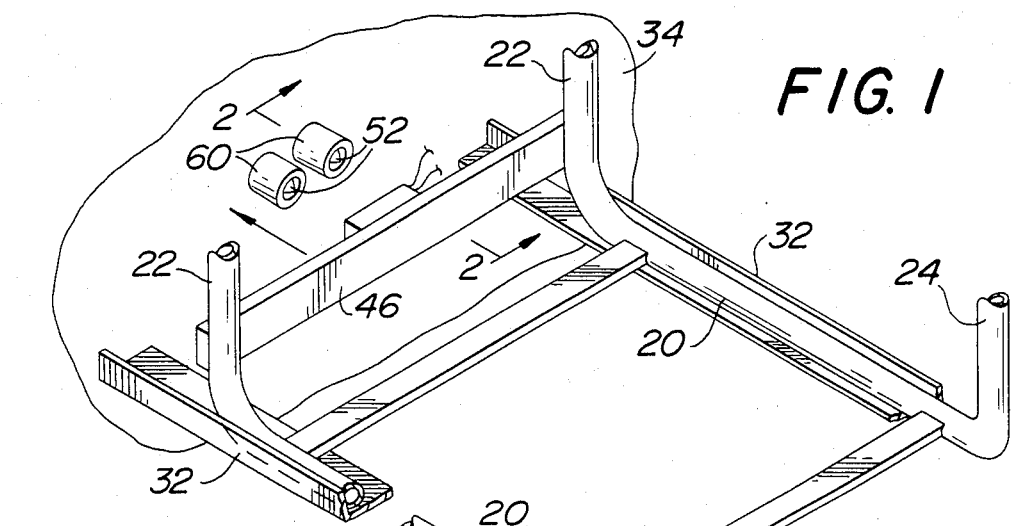
FIG. 1 is a fragmentary perspective view of a portable engine-pump unit in accordance with the invention.

The portable engine-pump unit of the invention comprises a portable carrying frame 10 in the form of a structure having an open box-like configuration. Mounted on the portable carrying frame are the major elements of the engine-pump unit, namely, an internal combustion rotary piston engine 12, a centrifugal pump 14, an electric starting system including a starter motor 15, a rechargeable storage battery 16 and circuit means for supplying a charging current to the battery 16, and a fuel supply means for the engine 12 including a fuel tank and a carburetor system 18.

The portable frame 10 comprises a pair of horizontally extending bottom legs 20 joined with a pair of upright rear legs 22 and a pair of upright front legs 24 as is best shown in FIGS. 1 and 7.

There is provided a stationary holder 30 for releasably receiving the portable frame 10 in a stored position, the portable frame 10 being movable into and out of this stored position in the stationary holder. The stationary holder 30 comprises a pair of spaced apart horizontally extending angle members 32 adapted to receive and support the horizontal bottom legs 20 of the frame 10 as shown in FIG. 1. The angle members 32 extend from a vertical wall 34 or other stationary supporting structure. The frame 10 is moved into the stored position by being placed onto the angle member 32 in a horizontal position and then moved horizontally toward the wall 34 until such movement is restricted by the engagement of means to be described hereafter.

Figure 4:
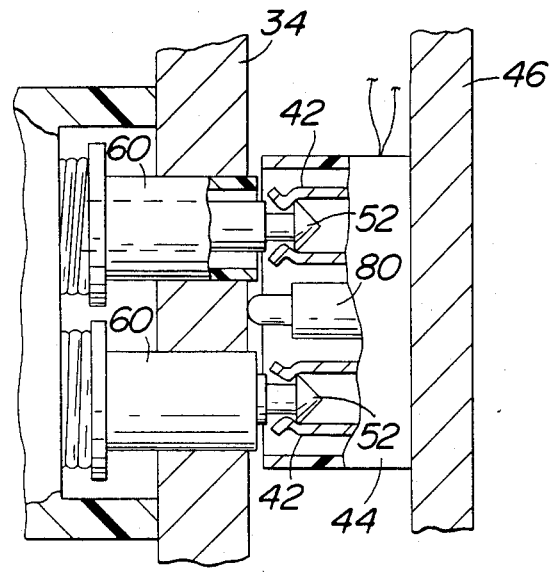
FIG. 4 is a section taken generally on line 4—4 of FIG. 3.
Figure 5:
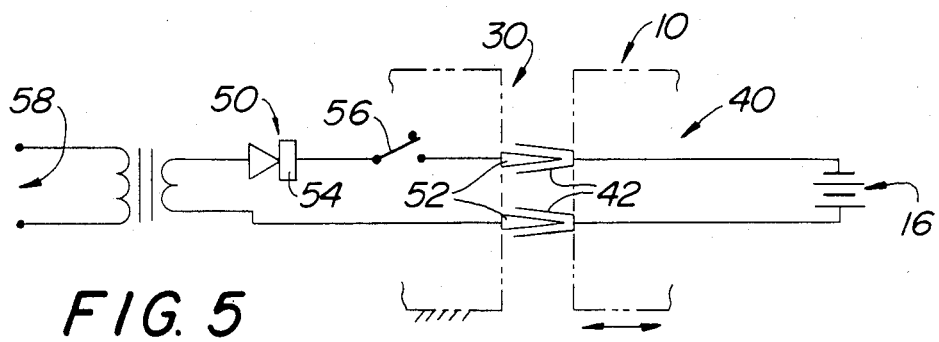
FIG. 5 is a schematic view of the charging circuit means.

As shown in FIG. 5, there is provided a circuit means 40 in the starting system for applying a charging current to the rechargeble storage battery 16, which may be a 12 or 24 volt D.C. nickel-cadmium battery. The circuit means 40 comprises a pair of electrical contacts 42 electrically connected to the terminals of the battery 16 and mounted on the frame 10. The electrical contacts 42 for the carrying current are contained in an outlet box 44 mounted on a bar 46 extending horizontally between the rear vertical legs 22 of the portable frame 10. The electrical contacts 42 are in the form of spring-like contact members forming one part of a bayonet-type of electrical connection as is shown in FIG. 4.

Figure 2:
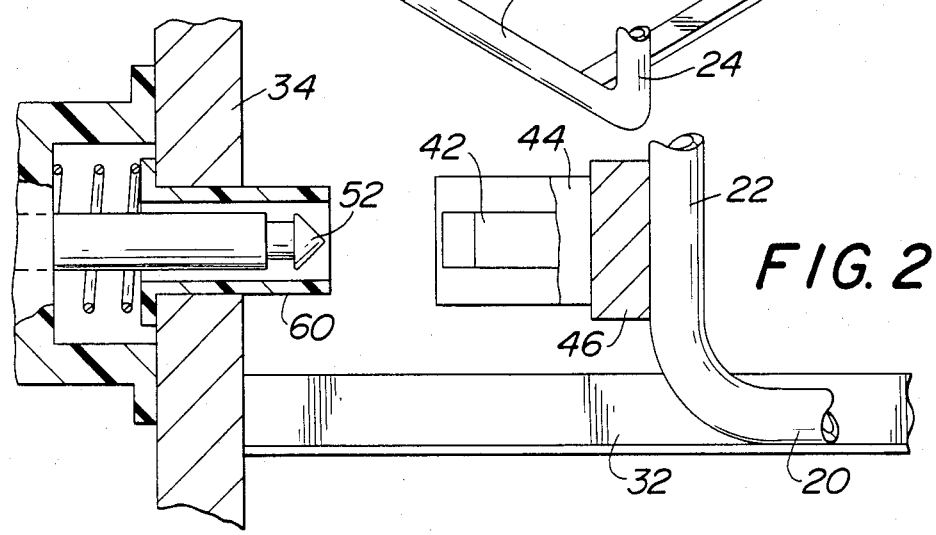
FIG. 2 is a section taken generally on line 2—2 of FIG. 1.
Figure 3:
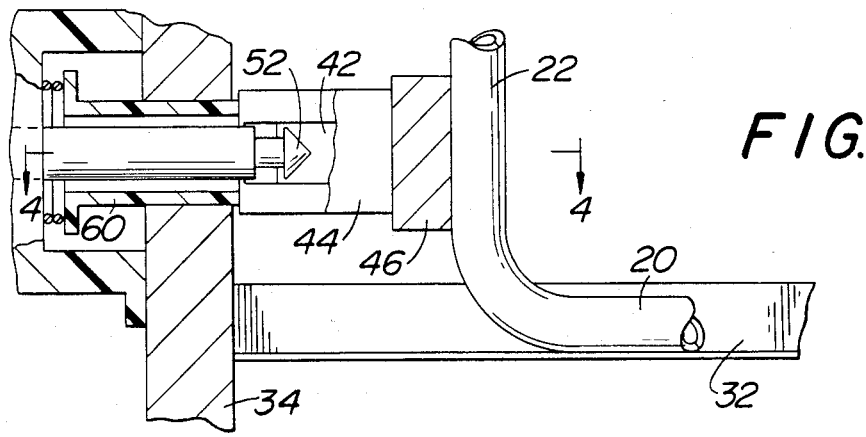
FIG. 3 is a view similar to FIG. 2 with the parts shown in the stored position of the unit.

The holder 30 is provided with means for supplying electric power to the electrical contacts 42 when the frame 10 is in the stored position. Such means comprises a circuit means 50 (FIG. 5) including a pair of electrical contacts 52, a rectifier 54 and an "ON/OFF" switch 56 connected in a circuit to a 110 volt alternating current power supply 58. The electrical contacts 52 are in the form of male-type electrical contact members of a bayonet connection and are mounted to extend from the wall 34 at a location in alignment with the contacts 42 when the frame 10 is in a guided position in angle members 32 as shown in FIG. 1. The contacts 52 are enclosed in a cylindrical sleeve 60 spring-biased outwardly to the position shown in FIG. 2 and movable to a retracted position within wall 34 (the position shown in FIG. 3) by contact with outlet box 44. FIGS. 3 and 4 show the condition of the parts in the stored position of frame 10 on holder 30. In this stored position, contacts 42 and 52 are engaged and the movement of frame 10 toward wall 34 is limited by the contact between outlet box 44 and the retracted sleeve 60.

As is apparent from FIG. 5, the two pairs of electrical contacts 42 and 52 are positioned to move into and out of electrical contact when the portable frame 10 moves into and out of its stored position on the stationary holder 30. When the portable frame 10 is in the stored position, the circuit means 40 and 50 are connected as is shown in FIG. 5 so as to permit the application of a charging current to the rechargeable battery 16 when the switch 56 is moved to the closed position. The rectifier 54 operates to convert the 110 volt alternating current supply to a 14 volt direct charging current for the rechargeable battery 16.

In operation, while the portable frame 10 is maintained in its stored position, the circuit means 40 and 50 will operate to maintain the battery 16 fully charged. When the portable frame 10 is moved from the stored position, the electrical contacts 42 and 52 move out of electrical contact thereby disconnecting the charging current from the power supply 58. However, the rechargeble battery 16 is in a fully charged condition and will perform its starting function with certainty.

Figure 6:
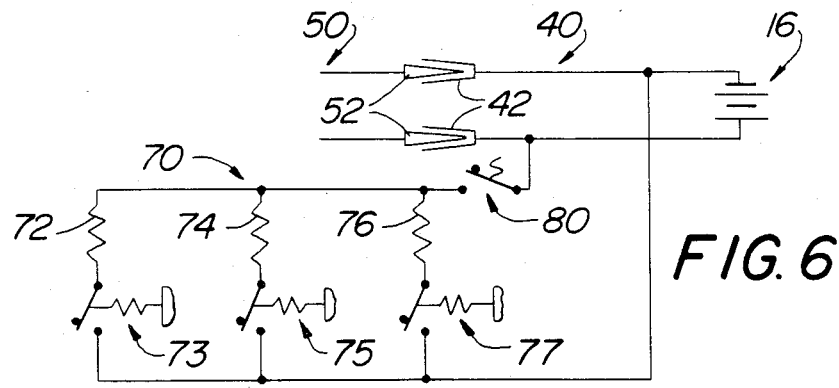
FIG. 6 is a schematic view of the heating circuit means.

In accordance with another feature of the invention, there is provided means for raising the temperature of the fuel supply for the engine 12 to improve the combustion efficiency thereof. Details of various fuel heating means for this purpose are set forth in may copending application filed on even date herewith. In FIG. 6 there is shown a circuit means 70 for energizing the electric heating means from the starting battery 16 only when the portable frame 10 is removed from the stored position and for preventing any heating action while the portable frame 10 is maintained in the stored position. The circuit means 70 comprises three electric resistance heaters 72, 74 and 76 connected in parallel and controlled by thermostatic control means 73, 75 and 77, respectively, such control means being in the form of a thermoswitch or a bimetal switch.

The circuit means 70 is normally maintained in the open condition by means of a control switch 80. As shown in FIG. 4, switch 80 is mounted on the bar 46 within outlet box 44 and comprises a switch button adapted to move into contact with the wall 34 when the portable frame 10 is in a stored position shown in FIGS. 3 and 4. The switch 80 is constructed and arranged so that it is in its closed position for energizing the heaters 72, 74 and 76 only when the portable frame 10 is removed from the stored position and is in its open position for preventing any heating action while the portable frame 10 is maintained in the stored position.

Heaters 72, 74 and 76 are constructed and arranged to heat the engine fuel supply at various locations. For example, heater 72 may be arranged to heat the fuel contained in the fuel bowl of the engine carburetor, such a heater being described in detail in my copending application. Heater 74 may be an immersion heater located in the engine fuel tank for heating the fuel contained therein, such a heater being described in my copending application. As is described in detail in my copending application, the engine may be provided with a starting fuel supply including a pressurized container for a gaseous fuel, such as propane. This container has an expansion passage through which the pressurized fuel is delivered to the engine. Heater 76 is constructed and arranged for heating this expansion passage.

I claim:

1. A light-weight manually portable engine-pump unit useable on board ships comprising a manually portable pump, an internal combusion engine, an electrical starting system for said engine including a starter motor, a rechargeable storage battery and first electrical circuit means for supplying a charging current to said battery, a manually portable carrying frame having said pump, said engine and said starting system mounted thereon, a stationary holder for releasably receiving said carrying frame in a stored position, said frame being movable into and out of said stored position in said holder, said first circuit means comprising an electrical contact means for said charging current positioned on said carrying frame for movement therewith, and power supply means including second electrical circuit means for supplying electrical power to an electrical contact means on said holder, said electrical contact means of said first circuit means being positioned to move into and out of electrical contact with said electrical contact means of said second circuit means when said carrying frame is moved into and out of said stored position on said holder, said first and second circuit means being constructed and arranged to supply a charging current to said battery when said carrying frame is in said stored position and to disconnect the supply of charging current when said carrying frame is moved out of said stored position.

2. A portable engine-pump unit according to claim 1 wherein said power supply circuit means comprises a rectifier for converting an alternating current power supply to a direct charging current for charging said battery.

3. A portable engine-pump unit according to claim 1 wherein said holder is provided with means for guiding said carrying frame into said stored position.

4. A portable engine-pump unit according to claim 1 wherein each of said electrical contact means comprises a pair of electrical contacts movable into and out of electrical contact.

5. A portable engine-pump unit according to claim 1 wherein said engine comprises a rotary piston engine provided with a fuel supply means for said engine, and including electric heater for heating the fuel in said supply, and circuit means for electrically energizing said electric heater from said storage battery.

6. A portable engine-pump unit according to claim 5 wherein said circuit means for electrically energizing said electrical heater comprises switch means for controlling the flow of electric current to said electric heater, said last-named switch means including electrical contact means on said carrying frame biased to a closed position and means on said holder for holding said last-named contact means in an open position to prevent the supply of electric current to said electric heater when said portable frame means is in its stored position, said means for biasing the electric contact to the closed position moving said electric contact to said closed position when said carrying frame is moved from said stored position.

7. An engine-pump unit according to claim 6 wherein said fuel supply means includes a fuel tank mounted on said carrying frame, said electric heating means being immersed in said fuel tank for heating the fuel therein.

8. An engine-pump unit according to claim 6 wherein said fuel supply means includes a carburetor bowl, said electric heating means being constructed and arranged to heat the fuel in said bowl.

9. An engine-pump unit according to claim 6 wherein said fuel supply means includes a pressurized container for a gaseous fuel having an expansion passage through which the pressurized fuel is delivered, said electric heating means being constructed and arranged for heating said expansion passage.

10. An engine-pump unit according to claim 5 including thermostatic control means for controlling the temperatures at which said electric heater is energized from said battery.

11. A light-weight manually portable engine-pump unit comprising
a light-weight manually portable pump,
a light-weight manually portable rotary piston engine,
an electrical starting means for said engine including a storage battery,
fuel supply means for said engine,
said fuel supply means including a pressurized container for a gaseous fuel supply having an expansion passage through which the pressurized fuel is delivered, and including an electric heating means located adjacent said expansion passage for heating the same, and electric circuit means for energizing said electric heater from said storage battery.

12. A portable engine-pump unit according to claim 11 including a fuel supply tank for containing fuel supplied to said engine, and heating electric heating means immersed in said fuel tank for heating the fuel in said tank, and circuit means for energizing said electric heating means immersed in said fuel tank from said storage battery.

13. A portable engine-pump unit according to claim 12 including thermostat control means for controlling the temperature to which said fuel in said fuel tank is heated.

* * * * *